April 12, 1966 D. R. MILLER ETAL 3,245,203
MACHINE FOR AUTOMATICALLY CLOSING AND STAPLING BOXES
Filed Jan. 28, 1964 10 Sheets-Sheet 1

INVENTORS
DONALD R. MILLER
ROBERT E. ABRAMS
BY RONALD A. DAPPER

ATTORNEYS

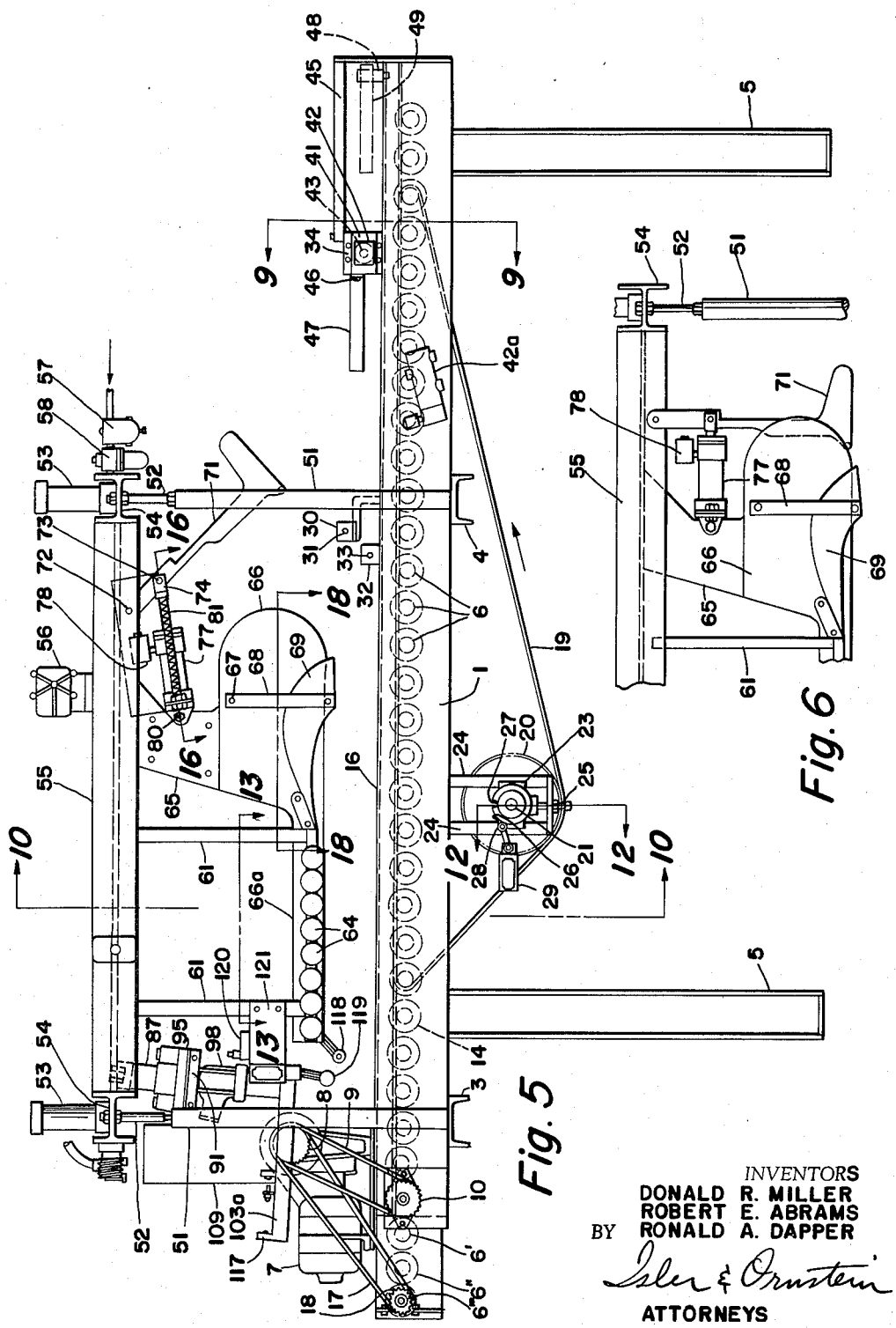

April 12, 1966   D. R. MILLER ETAL   3,245,203
MACHINE FOR AUTOMATICALLY CLOSING AND STAPLING BOXES
Filed Jan. 28, 1964   10 Sheets-Sheet 3
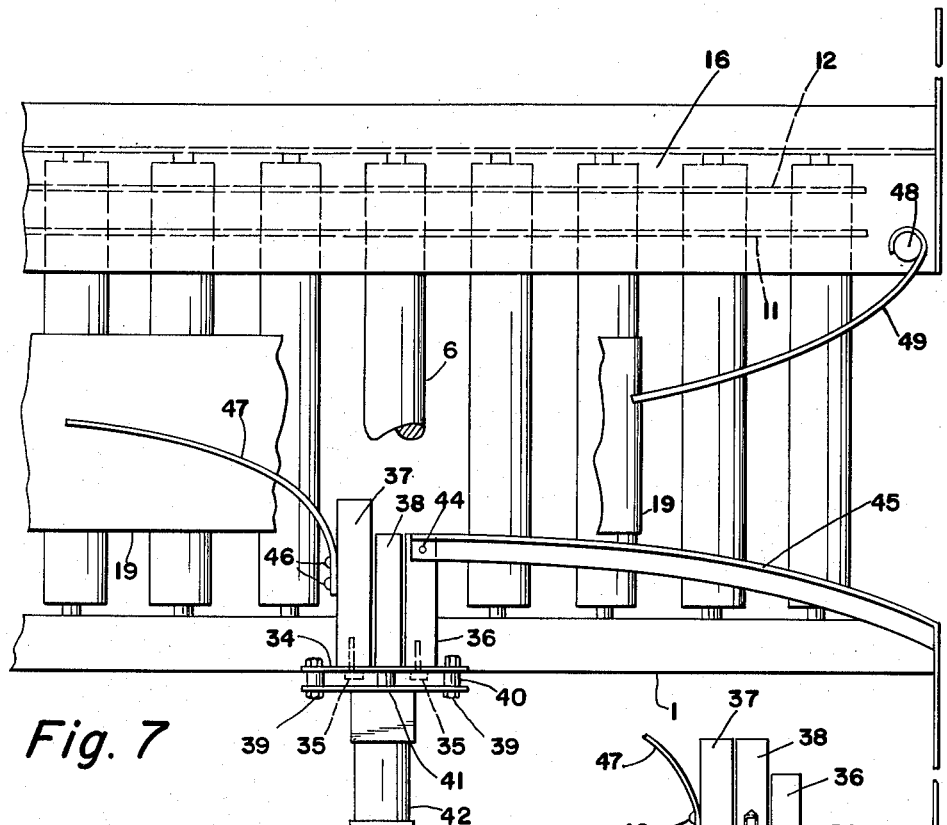
Fig. 7
Fig. 8
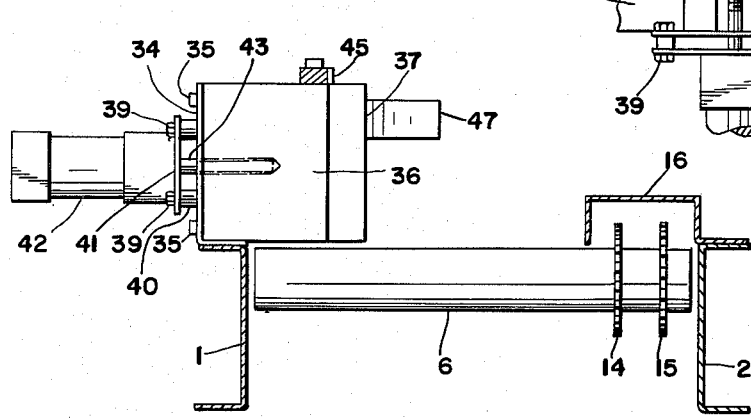
Fig. 9
INVENTORS
DONALD R. MILLER
ROBERT E. ABRAMS
RONALD A. DAPPER
BY
ATTORNEYS INVENTORS
DONALD R. MILLER
ROBERT E. ABRAMS
RONALD A. DAPPER
BY
*Isler & Ornstein*
ATTORNEYS April 12, 1966      D. R. MILLER ETAL      3,245,203
MACHINE FOR AUTOMATICALLY CLOSING AND STAPLING BOXES
Filed Jan. 28, 1964      10 Sheets-Sheet 5

INVENTORS
DONALD R. MILLER
ROBERT E. ABRAMS
BY RONALD A. DAPPER

*Isler & Ornstein*
ATTORNEYS

April 12, 1966 D. R. MILLER ETAL 3,245,203
MACHINE FOR AUTOMATICALLY CLOSING AND STAPLING BOXES
Filed Jan. 28, 1964 10 Sheets-Sheet 6
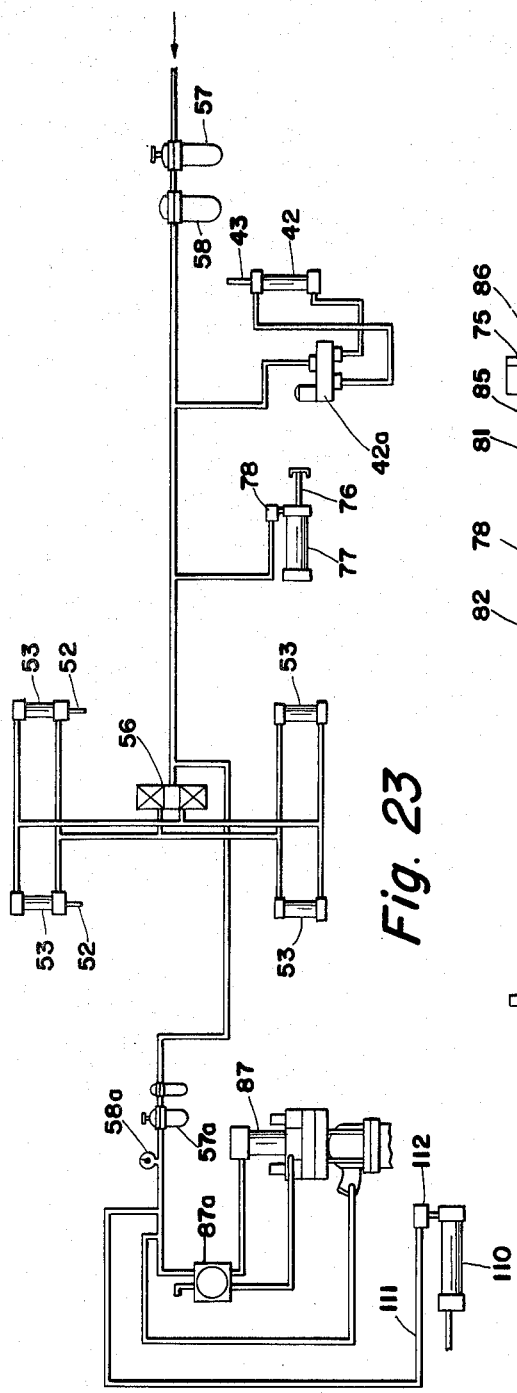
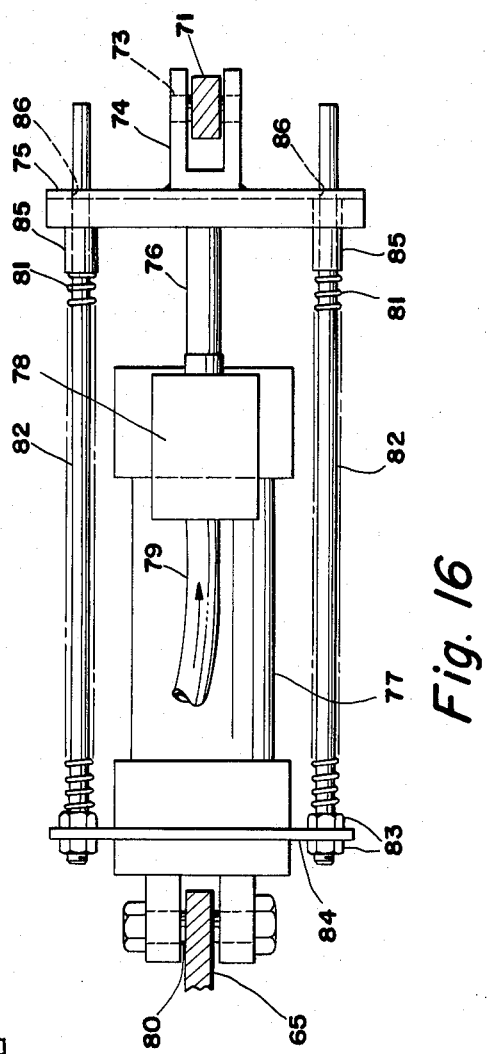
INVENTORS
DONALD R. MILLER
ROBERT E. ABRAMS
BY RONALD A. DAPPER
*Isler & Ornstein*
ATTORNEYS April 12, 1966  D. R. MILLER ETAL  3,245,203
MACHINE FOR AUTOMATICALLY CLOSING AND STAPLING BOXES
Filed Jan. 28, 1964  10 Sheets-Sheet 7

INVENTORS
DONALD R. MILLER
ROBERT E. ABRAMS
RONALD A. DAPPER
BY Isler & Ornstein
ATTORNEYS

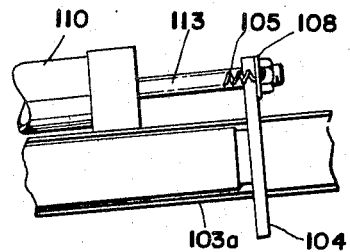
Fig. 22
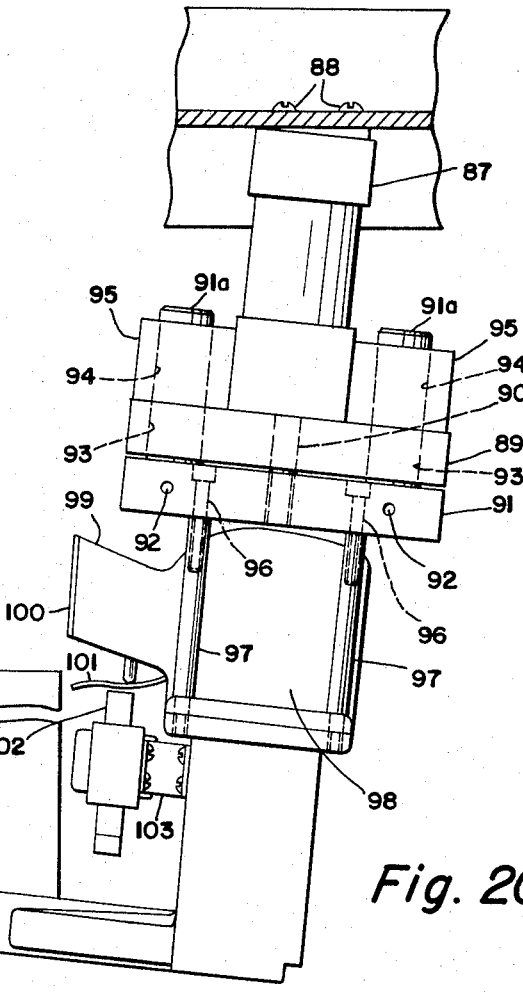
Fig. 20
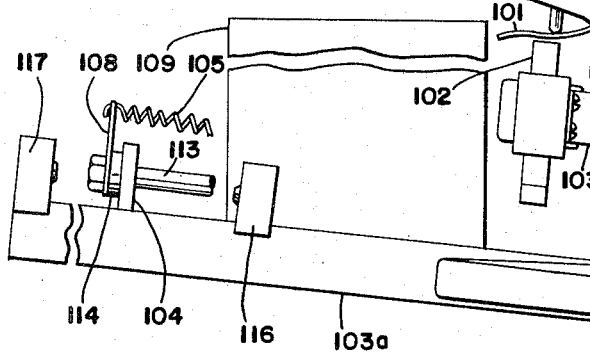
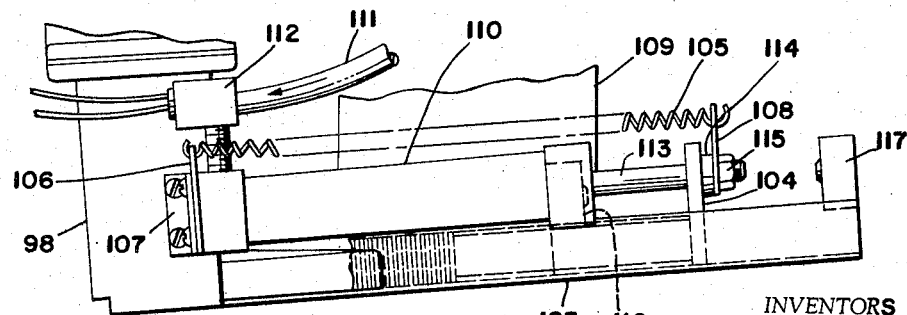
Fig. 21

INVENTORS
DONALD R. MILLER
BY ROBERT E. ABRAMS
RONALD A. DAPPER

*Isler & Ornstein*

ATTORNEYS

United States Patent Office 3,245,203
Patented Apr. 12, 1966

3,245,203
MACHINE FOR AUTOMATICALLY CLOSING
AND STAPLING BOXES
Donald R. Miller and Robert E. Abrams, Ashland, and
Ronald A. Dapper, Mansfield, Ohio, assignors to The
Union Malleable Manufacturing Company, Ashland,
Ohio, a corporation of Ohio
Filed Jan. 28, 1964, Ser. No. 340,616
11 Claims. (Cl. 53—347)

This invention relates generally to a machine for automatically closing and stapling boxes, but has reference more particularly to a machine which is especially adapted for closing and stapling boxes of the corrugated cardboard type having front, back and side flaps for closing the box.

A primary object of the invention is to provide a machine of the character described, which is operative to automatically index the boxes as they are introduced into the machine, close the front, back and side flaps in timed sequence, staple the side flaps to the front and back flaps, and eject the closed boxes from the machine.

Another object of the invention is to provide a machine of the character described, having means for effectively centering the boxes prior to the stapling thereof.

A further object of the invention is to provide a machine of the character described, having means for effectively holding down the flaps just prior to the stapling thereof.

A still further object of the invention is to provide a machine of the character described, having means responsive to variations in height of the boxes for adjusting the position of the flap-closing and hold-down means, whereby the machine is readily adapted for closing boxes of various heights.

A still further object of the invention is to provide a machine of the character described, in which air pressure and suitable electrical controls are utilized to as great an extent as possible in the operation of the machine.

Other objects and advantages of our invention will be apparent during the course of the following description.

In the accompanying drawings forming a part of this specification, and in which like numerals are employed to desingate like parts throughout the same, FIG. 1 is a perspective view, showing a box, as it enters the machine;

FIG. 5 is a side elevational view of the machine, showing the kicker arm in inoperative or elevated position;

FIG. 6 is a fragmentary elevational view, showing the kicker arm in operative or lowered position;

FIG. 7 is a fragmentary plan view of the entrance end of the machine, showing the index slide in retracted position;

FIG. 8 is a view similar to FIG. 7, but showing the index slide in advanced position;

FIG. 9 is a cross-sectional view, taken on the line 9—9 of FIG. 5;

FIG. 16 is a fragmentary cross-sectional view, taken on the line 16—16 of FIG. 5;

FIG. 20 is a fragmentary side elevational view, on an enlarged scale, of the stapling mechanism shown in FIG. 5;

FIG. 21 is a fragmentary view of the mechanism shown in FIG. 20, but showing the mechanism as viewed from the opposite side of the machine;

FIG. 22 is a fragmentary plan view of a portion of the mechanism shown in FIG. 21;

FIG. 23 is a diagram showing the air flow for controlling the various air cylinders of the machine;

Figure 1:
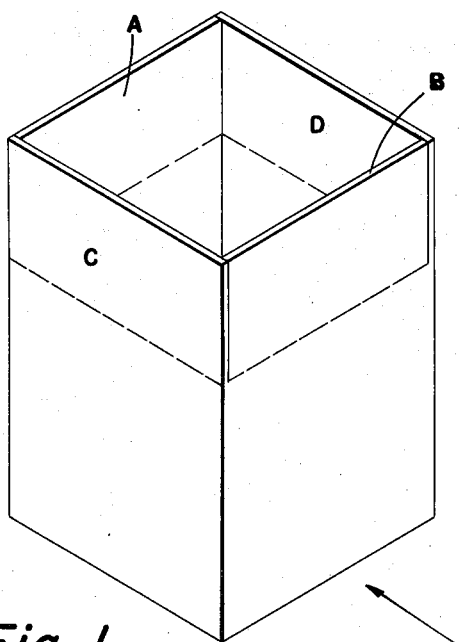

The machine may be described with relation to its various units thereof, as follows:

*Lower frame assembly and box conveyor*

The frame of the machine and the box conveyor are best seen in FIGS. 5–15.

Referring more particularly to FIGS. 5 to 15 inclusive of the drawings, the machine will be seen to comprise a base or bottom frame, consisting of transversely spaced members 1 and 2, of channel-shaped cross-section, which are interconnected by channel members 3 and 4, and supported by legs 5.

The members 1 and 2 have mounted therein a series of spaced live rollers 6, which are driven by a motor 7 (FIG. 5) through the intermediary of a wide or long sprocket 8, endless chain 9, sprocket 10, endless chains 11 and 12, connecting pairs, successively, of rollers 6 (FIGS. 14 and 15), and sprockets 14 and 15 which are welded to the ends of the rollers 6. The motor 7 is, in this instance, a ⅓ H.P. Gearhead Drive Motor. The chains 11 and 12 are covered by a chain guard 16 (FIGS. 5, 7, 9 and 10) which is mounted on the frame member 2, and which also serves as a support for the motor 7.

For a purpose to be presently described, the last three rollers 6′, 6″, and 6‴ (FIG. 5) are driven independently of the rollers 6, and at a speed which is greater than the speed of the rollers 6. For this purpose, these rollers 6′, 6″ and 6‴, are also driven by the sprocket 8 through a separate endless chain 17 and smaller sprocket 18.

The rollers 6 serve to drive continuously, in the direction indicated by the arow in FIG. 5, an endless traction belt 19, the upper run of which passes over all except a small number of the rollers adjacent the front and rear of the apparatus, and the lower run of which passes over an idler pulley or drum 20, having a shaft 21, the ends of which are journalled for rotation in plates 22 and 23, which are vertically slidable in brackets 24. For the purpose of adjusting the tension of the pulley or drum 20 on the belt 19, the position of the plates 22 and 23 may be adjusted vertically with respect to the brackets 24, as by means of a tension adjustment means, generally designated by reference numeral 25.

The shaft 21 has mounted thereon adjacent one end thereof a cam 26 having a notch 27 in its periphery. There is also depicted in FIG. 5 a cam follower 28 and a limit switch 29, the functions of which will be described in connection with the operation of the apparatus.

Figure 10:
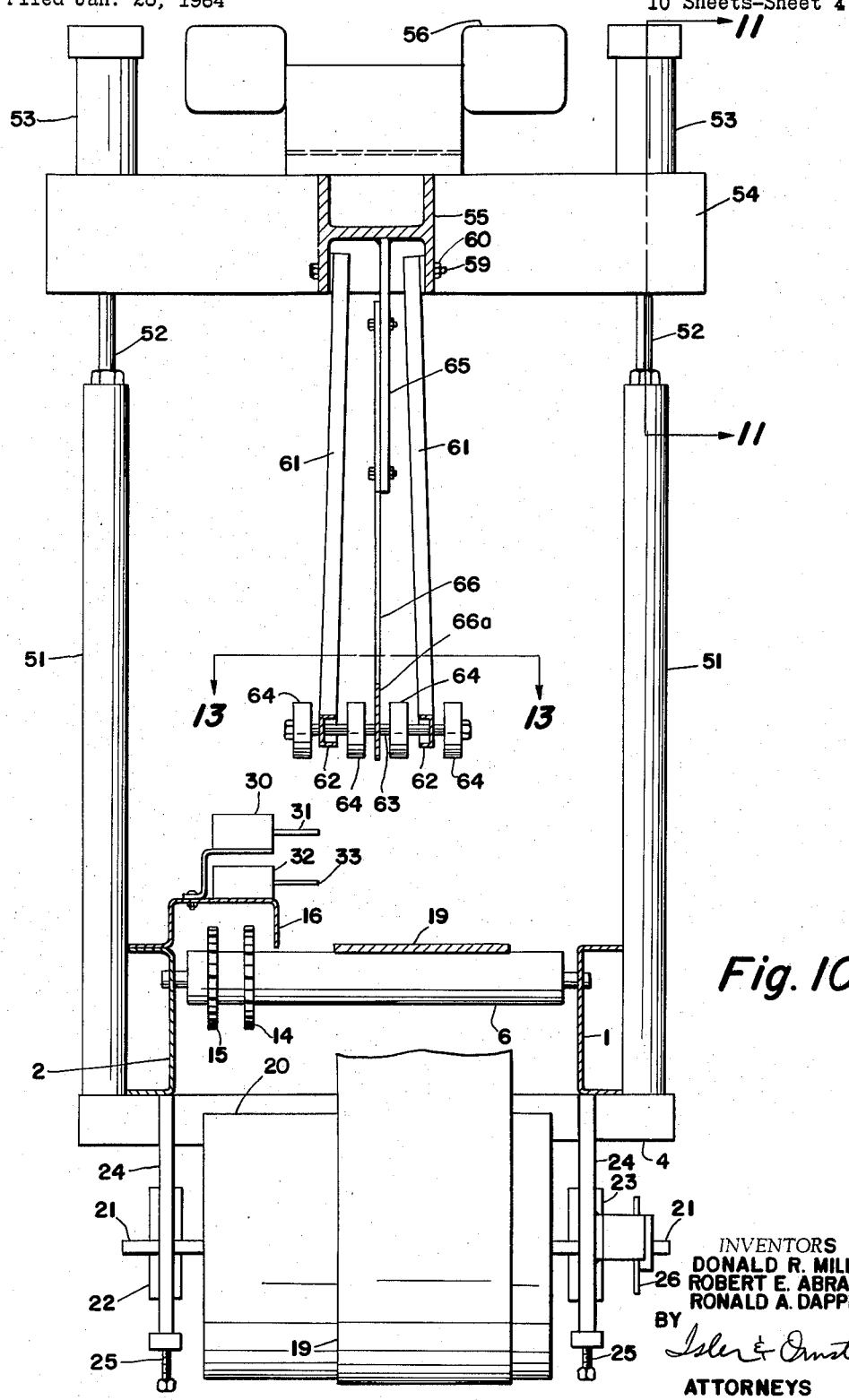
FIG. 10 is a cross-sectional view, taken on the line 10—10 of FIG. 5.
Figures 11, 12:
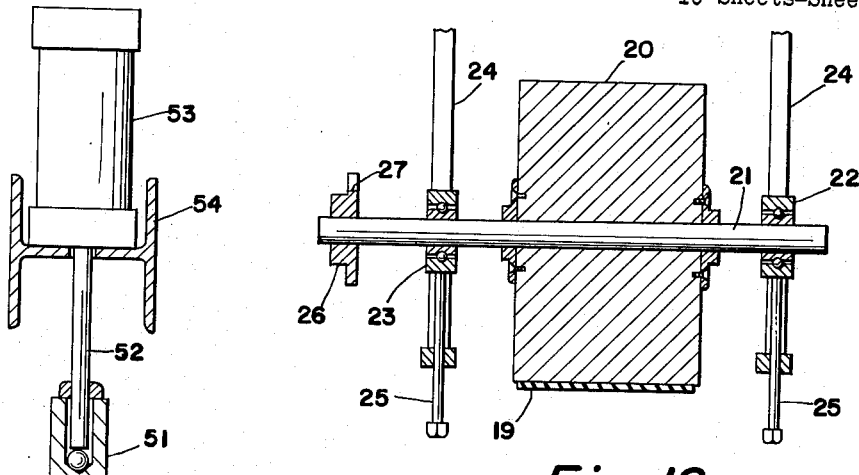
FIG. 11 is a fragmentary cross-sectional view, taken on the line 11—11 of FIG. 10.
FIG. 12 is a fragmentary cross-sectional view, taken on the line 12—12 of FIG. 5.

Mounted on the chain guard 16, as best seen in FIGS. 5 and 10, is an upper limit switch 30, having a feeler 31, and a lower limit switch 32, having a feeler 33, the switch 32 being spaced, in a direction longitudinally of the guard 16, from the switch 30. The functions of these limit switches will also be described in connection with the operation of the apparatus.

Box indexing mechanism

The box indexing mechanism is best seen in FIGS. 5, 7, 8 and 9.

This mechanism is mounted on the forward or entrance end of the frame member 1, and comprises a plate 34 which is rigidly mounted on the frame member 1 and has secured thereto, as by means of screws 35, spaced guide plates 36 and 37, which are of the same height, but of different lengths, and which form therebetween a guideway for slidable movement of an index slide 38, which is of the same height and length as the guide plate 36. The plate 34 has secured in rearwardly spaced relation thereto, as by means of bolts 39 and spacers 40, a back plate 41, an air cylinder 42, having a piston rod 43 which extends through aligned openings in the plates 41 and 34, and is secured to the index slide 38. The air cylinder 42 may be of the double acting, flush mounted type, such, for example, as a Schrader No. 30040 air cylinder, which is controlled by a four-way air valve 42a, which is preferably a Schrader No. 3455S JIC single solenoid valve. The valve 42a is also mounted on the frame member 1.

Secured to the upper edge of the guide plate 36, at the inner end of this plate, as by means of a screw 44, is a box or carton guide 45, which curves outwardly as it approaches the entrance end of the apparatus.

Secured to the outer face of the guide plate 37 comprising a stop plate as hereafter explained, as by means of screws 46, is a curved spring guide 47.

Secured to a post 48 which extends upwardly from the chain guard 16 at the entrance end of the apparatus, is a second spring guide 49.

Upper frame assembly

The upper frame assembly is best shown in FIGS. 5, 6 and 10, and may be described as follows:

Mounted on the channel members 3 and 4, at the outboard sides of the members 1 and 2, are posts or standards 51, which carry stationary piston rods 52 which, in turn, extend through air cylinders 53. These air cylinders are double-acting cylinders of the flush mounted type, such, for example, as Schrader No. 30042 JIC air cylinders, and are mounted upon and secured to the transversely extending beams 54 of a top or upper frame, which includes a beam 55 which interconnects the beams 54 at the central portions thereof. These air cylinders 53 function to raise and lower the top or upper frame for a purpose to be presently described.

The beam 55 has mounted thereon a four-way valve 56 which functions to operate the air cylinders 53. This valve may be a solenoid valve, such as a Schrader No. 826S-JIC double solenoid air valve.

The upper frame also supports an air filter 57 and air pressure regulator 58 through which the air is introduced to the valve 56. The unit, consisting of the filter and regulator, may be a Schrader No. 802 FRL airline lubricant-regulator-filter assembly.

The upper frame also carries a second air regulator 57a, and an air pressure gauge 58a (FIG. 23), for the air supply to the stapling mechanism to be presently described.

Roller hold-down assembly

Figure 13:
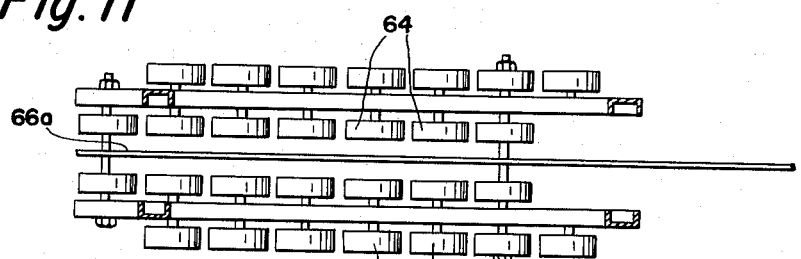
FIG. 13 is a fragmentary cross-sectional view, taken on the line 13—13 of FIGS. 5 and 10.
Figure 14:
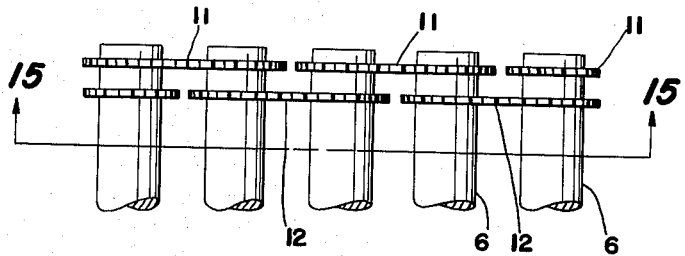
FIG. 14 is a fragmentary plan view, showing some of the live rollers of the box conveyor.
Figure 15:
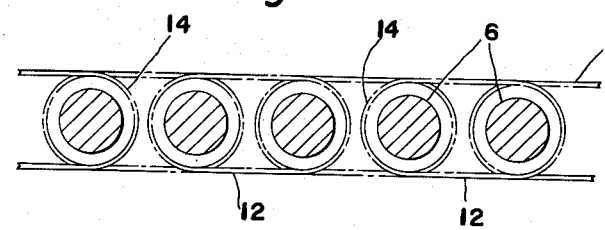
FIG. 15 is a fragmentary cross-sectional view, taken on the line 15—15 of FIG. 14.
Figure 17:
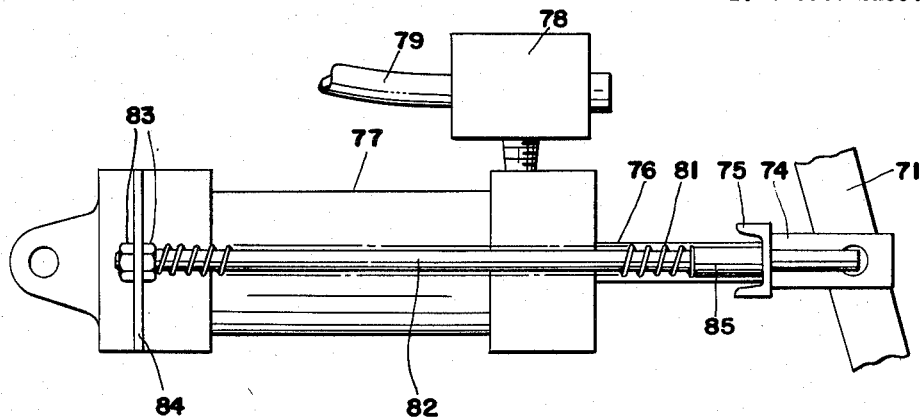
FIG. 17 is a side elevational view of the parts shown in FIG. 16.
Figure 18:
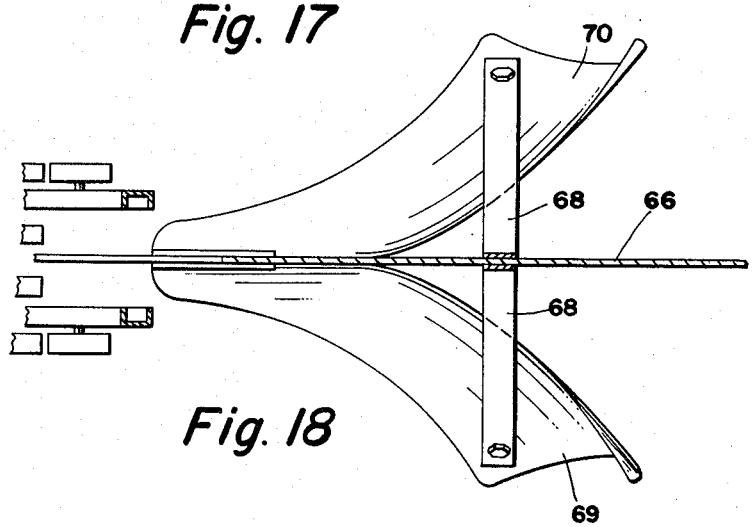
FIG. 18 is a fragmentary cross-sectional view, taken on the line 18—18 of FIG. 5, and showing the plow elements for closing the side flaps of a box.
Figure 19:
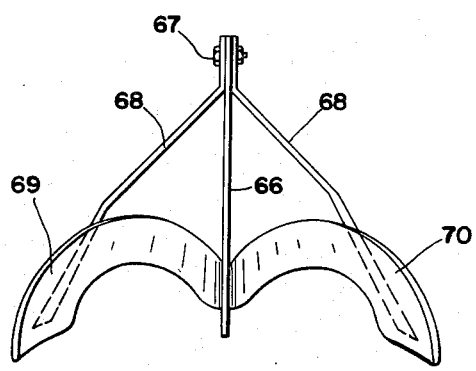
FIG. 19 is a view showing the parts in FIG. 18, as viewed from the right end of FIG. 18.

A roller hold-down assembly, for holding down all of the flaps of the closed box pending stapling of the box is best shown in FIGS. 5, 10 and 13, and may be described as follows:

Secured to the beam 55, at longitudinally-spaced points, as by bolts 59 and nuts 60, are depending frame members 61, which support frame members 62, in which are mounted shafts 63, on which are mounted compression rollers 64, which may be wheels of conventional roller skates, or of the roller-skate type.

Front flap depressor, centering guide and side flap closer

An assembly comprising a front flap depressor, centering guide and side flap closer is best illustrated in FIGS. 5, 10, 18 and 19, and may be described as follows:

Secured to the web of the beam 55, as by welding, is a mounting plate 65, to which is bolted a front flap depressor 66, the contour of which is best shown in FIG. 5, and which is provided with a rearward extension 66a, constituting a box-centering guide. Secured to the sides of the depressor 66, as by means of bolts 67, and brace members 68, are plow members 69 and 70, which function to turn down the side flaps of the container or carton which is to be closed and stapled. The contour of these plow members is best shown in FIGS. 5, 6, 18 and 19 of the drawings.

Back flap closing mechanism

Mechanism for closing the back flap of the box is best illustrated in FIGS. 5, 6, 16 and 17.

Referring to these figures of the drawings, there is disclosed mechanism for closing the back flap of the container or carton prior to the closing of the side flaps thereof. Such mechanism includes a kicker arm 71, which is pivotally secured to the beam 55, as at 72.

The arm 71, has pivotally connected thereto, adjacent its upper end, as by a pin 73, a clevis 74, to the rear end of which is welded a channel member 75. A piston rod 76 is welded to the web of the member 75, and extends into an air cylinder 77, which is controlled by a valve 78, which is mounted on the cylinder. The cylinder 77 is a double acting cylinder, of the bolt-mounted type, such, for example, as a Schrader No. 30010 JIC air cylinder. The valve 78 is a single 3-way solenoid valve, such, for example, as a Schrader No. 972JS single JIC 3-way solenoid valve. The air line to the valve 78 is indicated by reference numeral 79. The air cylinder 77 is pivotally connected to the mounting plate 65, as by a pivot pin 80.

For the purpose of automatically returning the arm 71 to the position shown in FIG. 5, spring means are provided, consisting of a pair of compression coil springs 81, which are mounted on guide rods 82. The guide rods 82 are secured at one end, as by nuts 83, to a mounting plate 84, which extends from the cylinder 77, while the other ends of these rods extend through guide bushings 85 which are secured to the web of the member 75, and through openings 86 in said web.

Stapling mechanism

For the purpose of stapling the side flaps of the carton or box to the front and back flaps, after the flaps have been closed, stapling mechanism is provided, which is best illustrated in FIGS. 5, 20, 21, 22 and 23.

Such mechanism includes an air cylinder 87, which is secured at a slight angular inclination to the beam 55, as by screws 88. The cylinder 87 is preferably a double acting cylinder of the flush mounted type, such, for example, as a Schrader No. 30040 JIC air cylinder, having a fixed guide block 89, through which the piston rod 90 of the cylinder extends. The cylinder 87 is controlled by a four-way solenoid valve 87a mounted on the beam 54, such, for example, as a Schrader No. 3455S double solenoid JIC solenoid valve.

The rod 90 has secured to its lower end an activating block 91, to which guide pins 91a are affixed, as by set screws 92, these guide pins extending through guide openings 93 in the block 89 and through openings 94 in guide blocks 95 which are mounted on the block 89 at opposite sides of the cylinder 87.

The activating block 91 has mounted therein screws 96, to which are threadedly secured extension bolts 97, which support a stapler, which is generally designated by reference numeral 98. The stapler 98 is a Bostitch D16AD Boxlok Stapler, which has been modified in the following manner:

A portion of the hand grip 99 of the Bostitch stapler is removed to the point indicated by reference numeral 100. The trigger 101 of the stapler, which, in the manual operation of such a stapler, would normally be activated by hand, is, instead, activated by a solenoid controlled trigger activator 102, the solenoid being mounted on a bracket 103, which is secured to the stapler.

The staples are fed to stapling position through a trough 103a which extends from the stapler, as by means of a staple pusher 104, which is constantly biased in a staple feeding direction by an extension coil spring 105, which is secured at one end to a plate 106 mounted on a bracket 107 affixed to the stapler, and at its other end to a plate 108 which exerts pressure against the pusher 104.

Means have also been provided for dropping additional clips of staples into the trough 103a after the clip of staples in the trough has been used. Such means includes a staple clip magazine 109, which is mounted on the trough 103a and into the open upper end of which addition clips may be stacked.

In order to permit the lowermost clip of staples in the stack to fall into the trough, the staple pusher 104 must be retracted, against the action of the spring 105, to a position in which such lowermost clip can fall into the trough. For this purpose, an air cylinder 110 is mounted on the bracket 107. This cylinder is a double-acting air cylinder of the neck mounted type, such, for example, as a Schrader No. 30901–0060 air cylinder, the piston of which is activated by an air line 111, controlled by a solenoid valve 112. The valve 112 may be a Schrader No. 972S single solenoid 3-way valve. The piston rod 113 of the cylinder 110 is connected, at its outer end, to a bracket 114, which is connected to the staple pusher 104, and to the plate 108 to which one end of the spring 105 is connected. The bracket 114 and plate 108 are retained against displacement from the rod 113 by a nut 115.

A solenoid switch 116 is provided on the trough 103a for the purpose of activating the air cylinder 110 to cause the staple pusher 104 to be retracted to a position in which the lowermost clip of staples in the stack can fall into the trough. This switch is energized after the supply of staples in the clip in the trough has been depleted.

A solenoid switch 117 is also provided at the rear end of the trough for the purpose of deactivating the air cylinder 110 after the aforesaid clip falls into the trough.

The apparatus further includes limit switches 118 and 119 (FIGS. 5 and 24), and a limit switch 120, which is mounted on a bracket 121 secured to the frame member 61. The functions of these limit switches will be presently explained.

*Operation of machine*

The operation of the machine may be described with reference to FIGS. 1–8, and the diagrams in FIGS. 23 and 24.

A box, which has been filled with items such, for example, as pipe fittings, is shown in FIG. 1, and has a front flap A, back flap B, and side flaps C and D, all of which are in condition to be closed.

The machine is activated by closing the main line switch 122 (FIG. 24) and pressing starter button 123. This activates relay 124, closing holding contacts 125, and at the same time, closing contacts 126, starting repulsion motor 7, which rotates conveyor rolls 6 and moves the belt 19.

The indexing of the boxes can be performed manually or automatically.

For manual indexing, the manual index button 127 is pressed, activating air solenoid 42a.

For automatic indexing of the boxes, rotation of the cam 26 activates switch 29, which activates solenoid 42a once for every 18 inches of travel of the belt 19.

There is also a third way of indexing in which a stapled box issuing from the stapling machine activates a roller switch 128 which activates air solenoid 42a. This is tied in with a height-sensing switch 129 which raises and lowers the upper frame assembly, depending upon the height of the boxes to be closed and stapled, in a manner to be presently described.

It will be assumed that the box, in the condition shown in FIG. 1, is introduced onto the rollers 6 in the direction indicated by the arrow and at the right hand end of FIGS. 5 and 7. As the rollers propel the box, the spring guide 49 biases the box toward the carton guide 45, which directs the front of the box against the rear surface of the guide and stop plate 37 (see FIG. 7).

When the air solenoid 42a is activated, the cylinder 42 is activated, causing the index slide plate 38 to be moved upward from the position shown in FIG. 7 to that shown in FIG. 8. This releases the box by moving it laterally out of engagement with the guide or stop plate 37, permitting the belt 19 to carry it forwardly through the machine. In the course of such movement of the box, it may be aligned by spring 47 with its forward movement as it is biased by this spring toward the guard 16.

The front of the box engages the feeler 31 of the normally closed limit switch 30, thus opening this switch, and then engages the feeler 33 of the normally-open limit switch 32, thus closing this switch, so that there is no movement of the knicker arm 71 until after the box has passed the feeler 31. During this interval of movement of the box, the front flap A of the box is closed, by the depressor 66. After the box has passed the feeler 31, the switch 30 closes, so that the circuit to the solenoid 78 is energized, causing air to flow into the cylinder 77 to thereby pull the kicker arm down to the position shown in FIG. 6, thereby closing the back flap B of the box. After the box has passed the feeler 33, the switch 32 opens, thereby deenergizing the circuit to the solenoid 78, and causing the kicker arm 71 to be returned to its normal raised position, as shown in FIG. 5.

Figure 2:
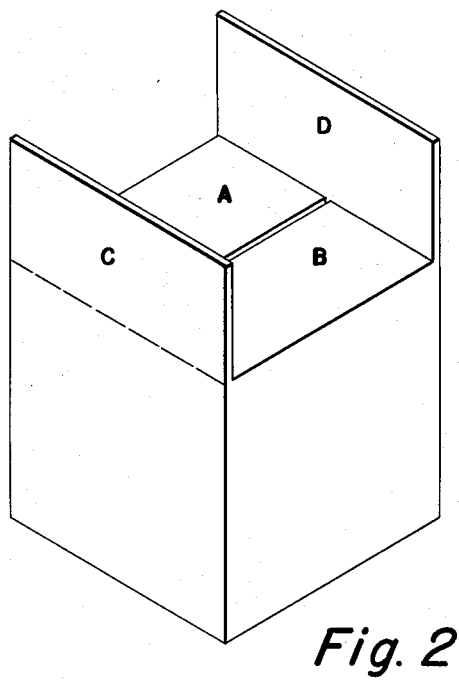
FIG. 2 is a view similar to FIG. 1, but showing the front and back flaps of the box closed.
Figure 3:
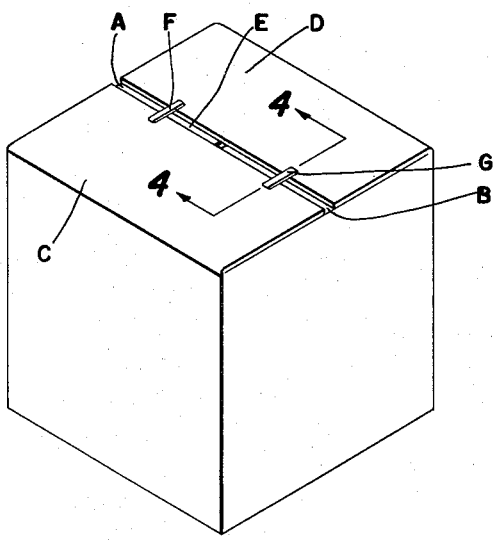
FIG. 3 is a view similar to FIG. 1, but showing the front, back and side flaps closed, and the staples holding the flaps closed.
Figure 4:
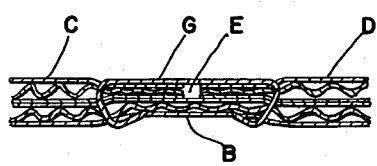
FIG. 4 is a fragmentary cross-sectional view, taken on the line 4—4 of FIG. 3.

With the front and rear flaps of the box closed, as shown in FIG. 2, the plow members 69 and 70 (FIGS. 18 and 19) function to gradually move the side flaps C and D of the box in an inboard direction and to close these flaps in the manner shown in FIG. 3, leaving a gap E (FIGS. 3 and 4) between the flaps C and D, which gap is traversed by the lower edge of the depressor 66 and of its box centering guide extension 66a. The depressor and centering guide 66–66a is thus effective to maintain movement of the box through the machine in a properly aligned manner.

The wheels 64 are effective to hold the flaps closed pending movement of the box to the stapling mechanism, and at the same time, to provide a desired pressure of the closed box against the conveyor belt 19 to insure positive movement of the box through the machine.

As the box advances, it engages the normally-open limit switches 118 and 119, raising the roller on switch 119, and thereby closing a circuit which activates air solenoid 87a through the contacts LRT, causing air to flow through the cylinder 87, moving the stapler 98 down to a stapling position.

By this time the box has moved beyond the continuously driven belt 19 onto forward rollers 6 which rotate beneath the box as pressure exerted by the lowered stapler head temporarily arrests forward movement of the box.

This movement of the stapler activates the limit switch

120. The switch 120 activates a time delay relay 130 and electrical solenoid 131, which effects the stapling action for staple F (FIG. 3), through normally closed time delay contacts 132, which time out and open at a preset time. As the contacts 132 open, normally-open time delay contacts 133 close, activating a relay 134, opening the LRT contacts and closing the LRB contacts. Air solenoid 87a is now deactivated and returns the stapler 98 to its normal or raised position, deactivating switch 120, which returns relay 130 to normal position, closing the contacts 132 and opening the contacts 133, deactivating relay 134.

As the box advances further, and passes switch 118, this switch is deactivated, closing normally closed contacts 135, and activating air solenoid 87a through the LRB contacts. The stapler 98 is thus again moved downwardly to the stapling position. This movement of the stapler activates the limit switch 120. The switch 120 activates the time delay relay 130 and solenoid 131, which effects the stapling action for staple G (FIG. 3), through contacts 132, which time out and open at a preset time. As the contacts 132 open, contacts 133 close, activating relay 134, opening the LRB contacts and closing the LRT contacts. Air solenoid 87a is now deactivated and returns the stapler 98 to its normal or raised position, deactivating switch 120, which returns the relay 130 to normal position, closing the contacts 132 and opening the contacts 133, deactivating relay 130. The stapling mechanism is thus ready for stapling the next box.

The discharge of the stapled boxes from the machine is expedited by reason of the fact that the speed of the conveyor rolls 6′, 6″ and 6‴ is greater than that of the other rolls 6.

As the supply of staples in the magazine 109 becomes depleted, a switch 136 is closed, activating a relay 136a and closing relay holding contacts 137 and contacts 138, which latter activate air solenoid 112, which in turn, indexes or drops a new clip of staples into the stapler trough 103a. At the same time, a switch 139 is activated opened, which deactivates relay 136a, which, in turn, opens contacts 137 and 138, which deactivates solenoid 112.

Figure 25:
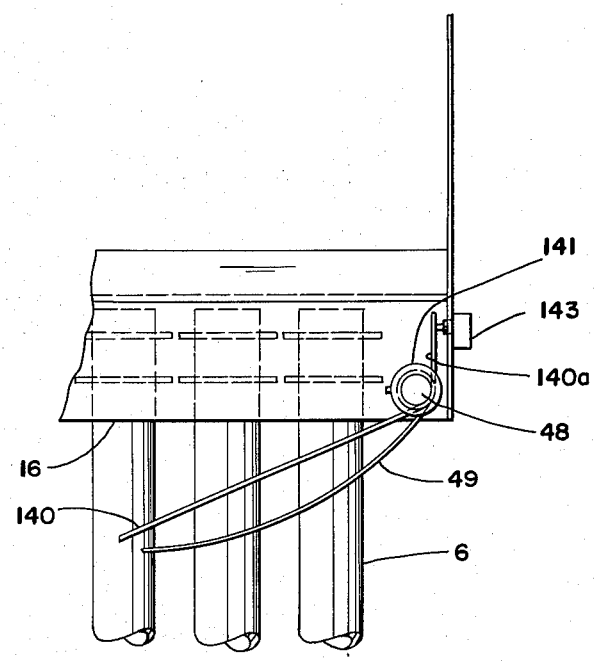
FIG. 25 is a view similar to FIG. 7, but showing means whereby the height of the upper frame assembly may be adjusted for different heights of boxes.
Figure 26:
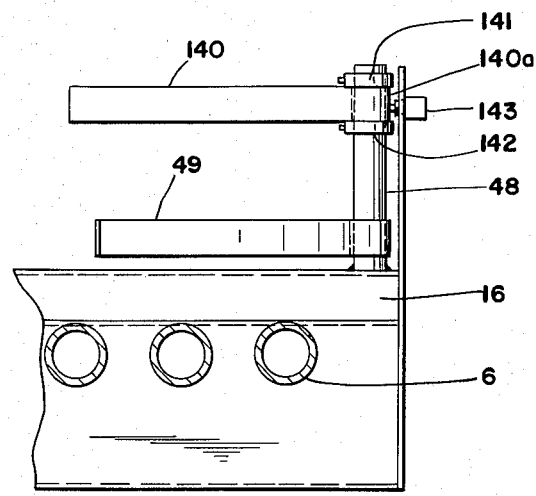
FIG. 26 is a view showing the parts illustrated in FIG. 25, in side elevation.

In FIGS. 25 and 26, there is illustrated means whereby the upper frame assembly of the machine may be automatically raised to permit passage through the machine of boxes which are higher (including the height of the raised flaps) than those for which the machine, as described, is adapted.

For this purpose, the post 48 which has been described in FIGS. 5 and 7, is extended vertically, so that it may have mounted thereon a box height sensing element 140, which is held in any adjustable position on the post 48 by means of retaining collars 141 and 142 affixed to the post. One end of the element 140 is adapted to bear against a switch 143 mounted on the lower frame assembly of the machine, so that movement of the element 140 in a clockwise direction about the post 48, as viewed in FIG. 25, causes the end 140a of the element to close the switch 143.

With such an arrangement, if a box of sufficient height to engage the element 140 is introduced into the machine, the switch 143 is automatically closed, thereby energizing the solenoid 56, and permitting air to enter the cylinders 53, thereby raising the upper frame assembly to a position in which closing and stapling of boxes of the different heights may be effected.

Figure 24:
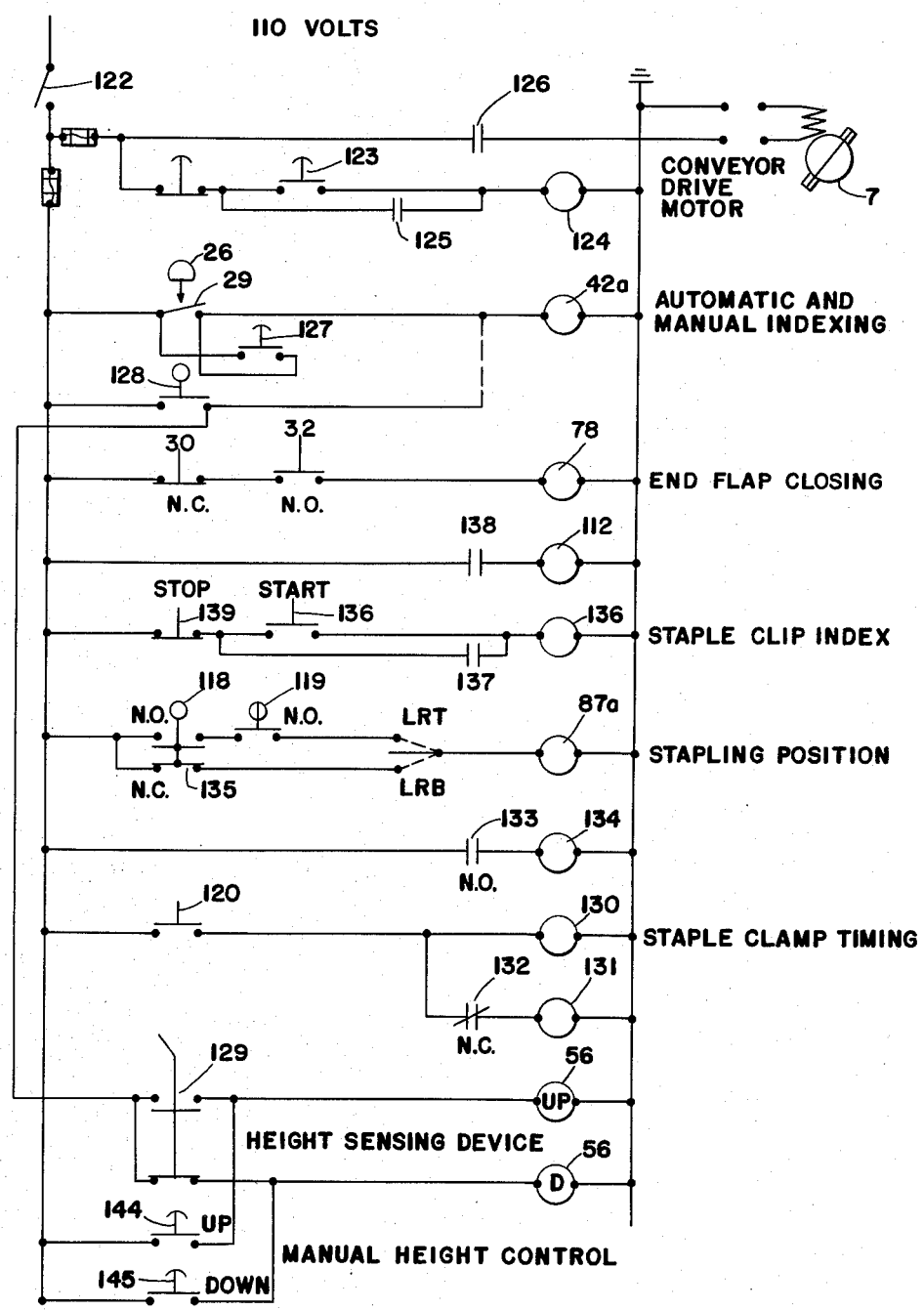
FIG. 24 is a diagram showing the electrical circuits for controlling the various air cylinder valves and other parts of the machine.

The switch 143 is identified in FIG. 24 as switch 129, and in this connection, it may be noted that the roller switch 128 which activates air solenoid 42a is tied in with the switch 129.

The height of the upper frame assembly may also be manually controlled by an "up" push button 144 or a "down" push button 145, both of which activate the air solenoid 56 (see FIG. 24).

It is thus seen that we have provided a machine of the character described which is operative to automatically index boxes as they are introduced into the machine, close the front, back and side flaps in timed sequence, staple the side flaps to the front and back flaps, and eject the closed boxes from the machine.

It is also seen that we have provided a machine of the character described, having means for effectively centering the boxes prior to the stapling thereof; means for effectively holding down the flaps just prior to the stapling thereof; and means responsive to variations in height of the boxes for adjusting the position of the flap-closing and hold-down means, whereby the machine is readily adapted for closing boxes of various heights.

It is further seen that we have provided a machine of the character described, in which air pressure and suitable electrical controls are utilized to as great and extent as possible in the operation of the machine.

It is to be understood that the form of our invention, herewith shown and described, is to be taken as a preferred example of the same, and that various changes may be made in the shape, size and arrangement of parts thereof, without departing from the spirit of the invention or the scope of the subjoined claims.

Having thus described our invention, we claim:

1. In a machine for folding and stapling the closure flaps of boxes provided with front, rear and side closure flaps, means for closing said flaps, means for stapling the closed flaps together, a continuously moving endless conveying means having an upper run which carries the boxes past said flap closing means toward said stapling means, said stapling means when actuated exerting pressure to retain said boxes during said stapling operation without arresting the movement of said upper run of said conveying means, and means for discharging the boxes from said machine after said stapling operation.

2. A machine, as defined in claim 1, in which a series of motor driven rollers are employed to drive said endless conveying means and support its said upper run.

3. A machine, as defined in claim 1, including a stop plate for temporarily retaining a box against movement, a curved guide member for directing the boxes toward said stop plate, and spring means for resiliently biasing the boxes against said guide member.

4. A machine, as defined in claim 2, including an indexing plate for moving the box laterally and out of engagement with said stop plate, a chain guard extending along one side of the machine, and a spring member for pushing said released box toward said chain guard to initially align the boxes with the machine.

5. A machine, as defined in claim 1, in which said flap closing means includes a depressor plate having a lower edge disposed within the gap between the closed side flaps of the box and is effective to provide a straight line guide for directing the boxes through the machine.

6. In a machine for folding and stapling the closure flaps of boxes provided with such flaps, means for stapling said closure flaps together, means for conveying said boxes to said stapling means, said last-named means comprising an endless friction belt, means for adjusting the tension of said belt including a drum, a shaft upon which said drum is mounted, means for indexing the delivery of boxes into said machine, and means responsive to the rotation of said shaft for activating said indexing means.

7. In a machine of the character described, a stapler, means for raising and lowering said stapler, means for advancing a clip of staples to stapling position, a magazine for containing additional clips of staples, said magazine disposed above said clip advancing means, and means responsive to depletion of said first-named clip for retracting said clip advancing means to a position wherein the lowermost additional clip from said magazine falls by gravity to a position for activation by said clip advancing means.

8. A machine, as defined in claim 7, in which said clip advancing means includes a staple pusher, an extension coil spring is provided for exerting pressure against said staple pusher, pneumatic means are provided for retracting said pusher against the action of said spring, and electrically energized means are provided for activating said pneumatic means after the supply of staples in said first-named clip is depleted.

9. In a machine of the character described, a stapler, means for lowering said stapler to a position for stapling the closed flaps of a box, means for raising said stapler to permit passage of the stapled box past the stapler, a trough containing a clip of staples, means for pushing said clip through said trough to advance the clips toward the stapler, a magazine disposed over said trough, said magazine containing additional clips of staples in vertical tier arrangement, and means responsive to depletion of said first-named clip for retracting said pushing means to a position wherein the lowermost additional clip from said magazine falls by gravity to a position for activation by said pushing means.

10. A machine, as defined in claim 9, including an extension coil spring for exerting pressure against said pushing means, pneumatic means for retracting said pushing means against the action of said spring, and electrical means for activating said pneumatic means after the supply of staples in said first-named clip has been depleted.

11. A machine, as defined in claim 5, wherein said depressor plate constitutes the sole means for guiding the boxes in a straight line during said flap closing operations.

References Cited by the Examiner

UNITED STATES PATENTS

| | | | |
|---|---|---|---|
| 1,783,814 | 12/1930 | Schroeder et al. | 53—374 |
| 1,893,496 | 1/1933 | Ferguson | 53—374 |
| 2,263,739 | 11/1941 | Rose | 53—374 |
| 2,439,189 | 4/1948 | Schafroth | 1—3.1 |
| 2,900,637 | 8/1959 | Schafroth | 1—331 |
| 2,910,815 | 11/1959 | Bartlett et al. | 53—374 |
| 3,070,934 | 1/1963 | Du Broff | 53—374 |
| 3,085,376 | 4/1963 | Ferguson et al. | 53—374 X |
| 3,122,750 | 3/1964 | Jackson et al. | 227—7 |
| 3,158,869 | 12/1964 | Jackson et al. | 1—331 X |

GRANVILLE Y. CUSTER, JR., *Primary Examiner.*